July 10, 1951     E. C. HATCHER     2,559,767
VARIABLE PITCH PROPELLER
Filed Oct. 2, 1945     2 Sheets-Sheet 1
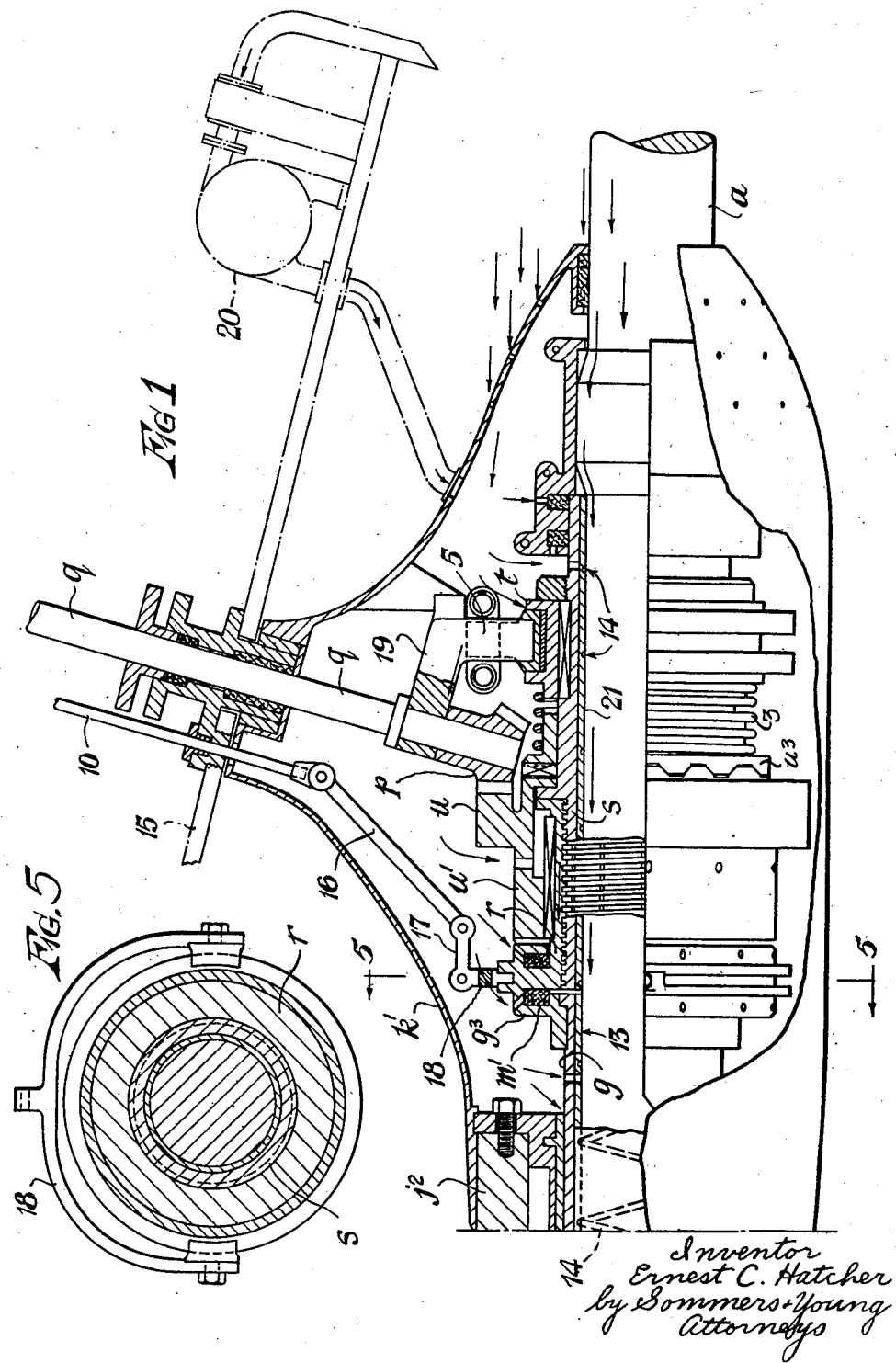
Inventor
Ernest C. Hatcher
by Sommers + Young
Attorneys July 10, 1951  E. C. HATCHER  2,559,767
VARIABLE PITCH PROPELLER
Filed Oct. 2, 1945  2 Sheets-Sheet 2
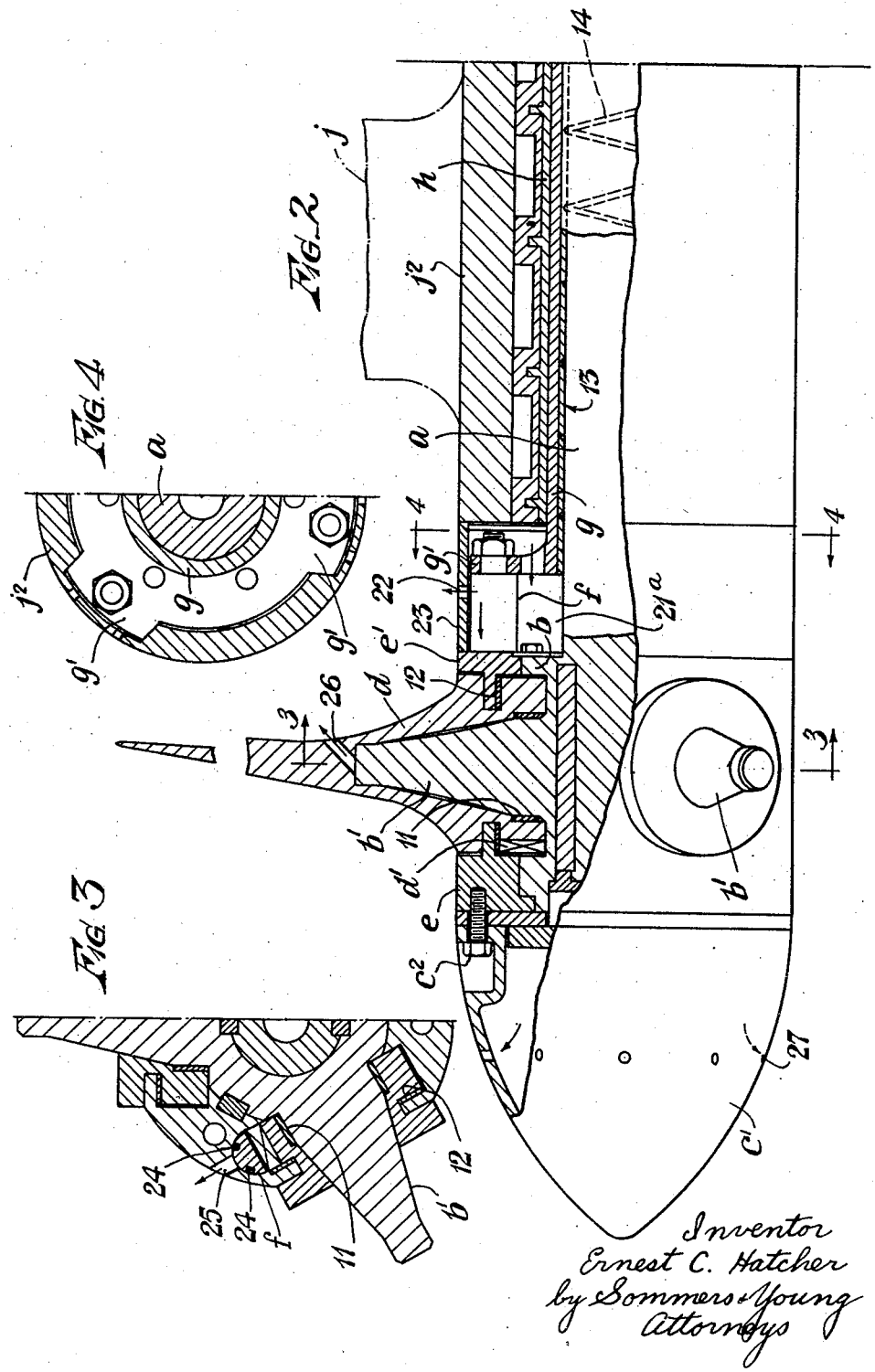
Inventor
Ernest C. Hatcher
by Sommers & Young
Attorneys Patented July 10, 1951

2,559,767

UNITED STATES PATENT OFFICE 2,559,767

VARIABLE PITCH PROPELLER

Ernest Charles Hatcher, Northwood, England, assignor to J. Stone & Company Limited, Deptford, England, a British joint-stock company Application October 2, 1945, Serial No. 619,759
In Great Britain May 30, 1944

3 Claims. (Cl. 170—160.23)

The present invention is concerned with variable pitch propeller mechanism for marine propellers of the kind wherein the blades are adjusted by means movable axially along the propeller shaft and lubricant is carried along the shaft for lubricating the various bearings and parts.

Heretofore, the constant and reliable lubrication of the various parts of these mechanisms has presented difficulties which are overcome by the present invention according to which means are provided for the circulation of the water of submersion along the shaft and through bearings of the pitch-varying mechanism for the lubrication thereof. Furthermore, and in order to provide surfaces suitable for this method of lubrication this invention provides liners or surfacing material of synthetic plastic material and the use of this material with water lubrication ensures easy action of the mechanism over long periods of time without attention.

The invention will be more fully described with reference to the draings, wherein:

Figures 1 and 2 are longitudinal sectional elevations and, taken together, they illustrate a variable pitch mechanism for marine propellers having the improved lubricating means of the present invention.

Figures 3 and 4 are transverse sections taken on the lines 3—3 and 4—4 in Figure 2 and as seen when looking in the direction indicated by arrows intersecting the respective lines.

Figure 5 is a cross-section on the line 5—5 of Figure 1.

In Figures 2 to 4 of the drawings, pitch variation of the propeller blades is performed in known manner by turning the blades through the medium of rack mechanism around radial pintles $b'$. Referring to Figures 2 to 4, the propeller blades are mounted by their roots $d$, on pintles $b^1$ and a bearing $11$ is provided around the base portion of each pintle $b^1$. Also, the parts $e$ $e^1$ are so formed that a thrust bearing $12$ for each blade is provided. A stream-line cap $c^1$ is attached to the boss or hub of the propeller by screws $c^2$. The ends of the rack rods $f$ are secured by nuts to the lugs $g^1$ of the sleeve $g$ which is slidable along the shaft $a$ and runs in a bearing $h$ in the bearing tube or housing $j^2$ at the foot of the stern bracket $j$. Within the sleeve $g$ there is a bearing liner $13$ which is formed with a helical groove $14$ along its interior for a purpose to be explained. The bearings $11$, $12$ and $13$ may all be formed from synthetic plastic material, for the parts with which they are associated only turn in relation to one another when a pitch-varying operation is performed. In Figure 1, the shaft $a$, sleeve $g$ and line $13$ are continued and are seen to pass into a stream-lined gear box or casing $k^1$ which at its rear end is fitted on to the forward end of the bearing housing $j^2$ at the foot of the stern bracket. The casing $k^1$ is also supported by attachment to the stern part of the bottom $15$ of a ship. The indicator rod $10$ is connected by a link $16$ with the arm $17$ of a bell-crank lever, the other arm $18$ of which is elongated and forked, the prongs of the fork at their extremities being engaged, as seen in Figure 5, in a peripheral groove in a flange formation $g^3$ on one end of the sleeve $g$, which flange $g^3$ form part of the thrust coupling $m^1$ between the sleeve $r$ and the sleeve $g$. On the extended part of the screw $s$ sleeved on the shaft $a$ there is keyed a brake drum $t$ and the brake blocks which are tightened on to the drum $t$ by springs, are spread apart and loosened from the drum by a wedge formation $5$ on the end of a bent arm $19$. The hub of the latter is passed on to the lower end of the uprising shaft $q$ and is held against a flange on the shaft $q$ when the pinion $p$ is keyed on the bottom end of such shaft. The pinion $p$, as before, meshes with a toothed annulus $u$ having an extended hub part $u^1$ feathered on the internally screw threaded sleeve $r$. A clutch member $u^3$ which can slip in either direction when required is under the influence of a spring $3$ and operates between the brake drum $t$ and the toothed annulus $u$.

The operation of the pitch varying mechanism may be described briefly as follows: With the parts in the position seen in Figure 1, the brake blocks are in operation against the drum $t$ to prevent the turning thereof. The shaft $q$ may now be turned so as to cause the pinion $p$ to turn the toothed annulus $u$ and its hub part $u^1$. The latter thus turns the threaded sleeve $r$ which screws itself along the hollow screw $s$ and thus imparts longitudinal motion to the sleeve $g$ which operates the rack rods $f$ for varying the pitch. The toothed annulus $u$ can turn in relation to the brake drum $t$ owing to the slipping of the clutch $u^3$. An indication of the movement of the sleeve $g$ is transmitted by the lever $18$, $17$ and link $16$ to the rod $10$ which is connected with an indicator. When a pitch adjustment has been carried out, the shaft $q$ is pulled upwardly so as to take the pinion $p$ out of mesh with the toothed annulus. This upward movement of the shaft $p$ carries with it the arm $19$ and wedge $5$ whereupon the wedge $5$ releases the brake blocks from the drum $t$ so that the latter together with the annulus $u$, sleeve $r$ and screw $s$ are all free to revolve with the shaft $a$ until the next pitch varying operation is performed.

The feature chiefly to be illustrated by Figures 1 to 4 is that of lubrication by sea water of the bearing parts associated with the pitch-varying mechanism. By reference to Figure 1, it will be seen that the forward or nose portion of the casing $k^1$ is perforated and as this casing is submerged it becomes flooded with sea water entering through the perforations. If desired, and in place of or in addition to the perforations, a pump 20 may be installed in the ship and may draw in sea water through a screen or filter and forcibly deliver such water into the casing $k^1$ as indicated by the arrows. Various parts within the casing are formed with perforations so that the water can have access to bearing faces as indicated by the various arrows. A liner 21 similar to the liner 13 extends along the shaft $a$ over that portion whereon are sleeved the screw $s$ and brake drum $t$ and the liner 21 is formed with a helical groove 14 like the liner 13. The result is that sea water can travel along between the shaft $a$ and the whole length of the liners 21 and 13. At the aft end such water escapes into the annular space 21$^a$, Figure 2, wherein are situated the lugs $g^1$ and rack rods $f$, and is delivered by centrifugal force outwardly through holes 22 in an annular shroud 23. As shown in Figure 3, the rack rods $f$ may be fitted with bearing strips 24 against which they bear during their sliding movements. Water passing along the rack rods $f$ for lubrication purposes may be delivered by centrifugal force outwardly through holes 25 in the propeller boss. Water having access to the bearing surfaces 11 and 12 of the pintles $b^1$ may likewise be delivered outwardly through ducts 26, Figure 2, formed in the propeller blades. The cap $c^1$ may be formed with holes 27 also for the delivery of water by centrifugal force and thereby to assist in the promotion of the passage of water over the parts in question. The bearing strips 24 and the bearing surfaces 11 and 12, like the liners 21 and 13, may be synthetic plastic material, as also may be some of the other bearing surfaces within the casing $k^1$ Fig. 1. The use of this material with water lubrication, ensures easy action of the submerged pitch varying mechanism over long periods of time without attention. If desired, vane devices may be fitted within the holes 22 and 27 in order to increase the strength of the current flow along the shaft $a$.

It is proposed that in order to avoid any electrolytic or chemical combinations which may be set up due to the use of non-ferrous materials of a similar character working in contact, where necessary the parts in contact can be separated by chromium plating or similar means. For the rest all materials used in the construction will be impervious to sea-water corrosion.

I claim:
1. Variable pitch revoluble propeller assemblage, a propeller shaft mounting said assemblage, said assemblage comprising in combination revoluble propeller parts including rotatably adjustable blades having support engaging bearing surfaces, toothed gearings around the roots of each of said blades, rack rods movable axially of said shaft meshing with each of said gearings and provided with support engaging bearing means, a sleeve movable axially along the propeller shaft and coupled with said rack rods, a liner of synthetic plastic material within said sleeve and surrounding said shaft, said sleeve being internally grooved for the passage of water along said shaft, and means drivingly connected with said revoluble propeller parts and revoluble therewith to induce by centrifugal action the flow of water of submersion along said propeller shaft and in contact with said bearing surfaces of said blades and said bearing means of said rack rods.

2. Variable pitch propeller assemblage as claimed in claim 1, and in which the bearing means of the rack rods are bearing strips which are formed and arranged for a free flow of water of submersion over said rack rods.

3. Variable pitch propeller assemblage as claimed in claim 1, and further comprising water forcing means disposed at the forward end of said assemblage and operative for the positive forcing of the water of submersion along the propeller shaft, such water forcing means being supplementary to the centrifugally acting induction means associated with the revoluble propeller parts.

ERNEST CHARLES HATCHER.

REFERENCES CITED

The following references are of record in the file of this patent:

UNITED STATES PATENTS

| Number | Name | Date |
|---|---|---|
| 1,174,244 | Edens | Mar. 7, 1916 |
| 1,510,436 | Englesson | Sept. 30, 1924 |
| 1,832,335 | Thomas | Nov. 17, 1931 |
| 1,832,493 | Marsiluis | Nov. 17, 1931 |
| 1,898,659 | Gardner | Feb. 21, 1933 |
| 2,007,417 | Aivaz | July 7, 1935 |
| 2,261,915 | Korte et al. | Nov. 4, 1941 |
| 2,279,633 | Merickle | Apr. 14, 1942 |
| 2,285,050 | Pezzillo | June 2, 1942 |
| 2,368,191 | Berg | Jan. 30, 1945 |

FOREIGN PATENTS

| Number | Name | Date |
|---|---|---|
| 123,453 | Austria | June 25, 1931 |